United States Patent
Hamid-Samimi

[19]

[11] Patent Number: 6,024,999

[45] Date of Patent: *Feb. 15, 2000

[54] PROCESS FOR PRODUCING PASTEURIZED LIQUID EGG PRODUCTS

[76] Inventor: Mohammad Hossein Hamid-Samimi, 2221 Highgate Dr., Richmond, Calif. 94806

[*] Notice: This patent issued on a continued prosecution application filed under 37 CFR 1.53(d), and is subject to the twenty year patent term provisions of 35 U.S.C. 154(a)(2).

[21] Appl. No.: 08/805,079

[22] Filed: Feb. 21, 1997

Related U.S. Application Data

[63] Continuation of application No. 08/379,016, Jan. 27, 1995, abandoned.

[51] Int. Cl.[7] ............................. A23B 13/00; A23B 55/00; A23L 1/32
[52] U.S. Cl. .......................... 426/392; 426/614; 426/407; 426/330.1; 426/399; 426/401; 426/521
[58] Field of Search .................................... 426/614, 392, 426/407, 330.1, 521, 401, 399

[56] References Cited

U.S. PATENT DOCUMENTS

| | | | |
|---|---|---|---|
| 3,658,558 | 4/1972 | Rogers et al. | 426/614 |
| 4,957,760 | 9/1990 | Swartzel et al. | 426/614 |
| 4,994,291 | 2/1991 | Swartzel et al. | 426/614 |
| 5,028,448 | 7/1991 | Ros | 426/614 |
| 5,167,976 | 12/1992 | Papetti | 426/614 |
| 5,283,033 | 2/1994 | Dodrill | 426/407 |

FOREIGN PATENT DOCUMENTS 2278992  12/1994  United Kingdom.

OTHER PUBLICATIONS

Database Abstract. An 74(10)Q0149 FSTA for Poultry Science, 1974, 53 (2) pp. 636–645. Authors: Cotterill et al, Oct. 1974.

Stadelmann et al. Egg Science and Technology. 1977. AVI Publishing Company, Inc. pp. 175–180.

Primary Examiner—Anthony J. Weier
Attorney, Agent, or Firm—Rankin, Hill, Porter & Clark LLP

[57] ABSTRACT

A process for producing pasteurized liquid egg products utilizing a vat or tank for holding raw egg product. The raw egg product is transferred to a suitable package at amibient temperatures or after preheating. The package containing the raw egg product is then heated and maintained at a suitable temperature in order to pasteurize the liquid raw egg products in the packets. The containers holding the pasteurized liquid egg product is then cooled at a rate sufficient to refrigerate the containers and to inhibit germination of the bacterial spores in the liquid egg product found in the containers. The containers are then stored in refrigeration conditions for distribution and use.

18 Claims, 1 Drawing Sheet

PROCESS FOR PRODUCING PASTEURIZED LIQUID EGG PRODUCTS

RELATED APPLICATIONS

This application is a continuation of U.S. patent application Ser. No. 08/379,016 filed Jan. 27, 1995, now abandoned.

BACKGROUND OF THE INVENTION

The present invention relates to a novel process for producing pasteurized raw liquid egg products.

Raw liquid whole egg product, which may be a mixture of raw and previously pasteurized or otherwise treated liquid egg product, has been used for many years to replace whole eggs. Liquid whole egg products have generally been considered to be more convenient for use, especially on a large scale. Liquid whole egg product is currently subjected to pasteurization processes to produce a pathogen-free food having a long shelf life.

In the United States pasteurization is generally conducted by applying heat to achieve a minimum temperature of 60 degrees centigrade for a period of 3.5 minutes. Other countries pasteurize foods under different standards. The objective of pasteurization of egg products is to produce a salmonellae-negative product, although growth of other microorganisms is also inhibit by this process.

Reference is made to an article by P. M. Foegeding and N. W. Stanley, "Growth and Inactivation of Microorganisms Isolated ftom Ultrapasteurized Egg" Journal of Food Science, Vol. 52, No. 5, 1987, T. 1219–1227, which indicates that there are several types of microorganisms found in raw egg products. For example, Pseudomonas sp, enterococcus sp, dB circulans, and B. cereus isolate, are among such microorganisms which may be isolated from raw liquid whole egg.

Many systems have been proposed to process raw whole egg roducts. For example, an article by, H. R. Ball, Jr. et al., "Functionality and Microbial Stability of Ultrapasteurized, Aseptically Packaged Refrigerated Whole Egg", Journal of Food Science, Vol. 52, No. 5, 1987, p. 1212–1218, describes the pasteurization of liquid whole egg followed by aseptically packaging the same. Although adequate, aseptic packaging techniques are restrictive in that only certain size and types of packages may be employed with apparatuses designed to achieve this task.

U.S. Pat. Nos. 2,565,311 and 2,936,240 describe prior art whole egg pasteurization processes in which the steps of heating, chilling, and packaging occur in that order.

U.S. Pat. No. 3,232,769 shows a method of preparing eggs and food products in which the whites and yolks of eggs are separated, cooked, and then mixed with salad ingredients and lactic acid to adjust the pa of the mixture. Packaging and sealing occur followed by heating to a Temperature of 170 degrees fahrenheit to destroy harmful agents.

U.S. Pat. Nos. 3,404,008; 3,579,631; and 4,511,589 teach processes for pasteurizing egg products which employ heat exchangers. Pasteurized egg products are packaged following the use of the apparatuses shown in these references. It has been found that heat exchangers tend to foul during such processes, although successful in pasteurizing the raw egg product.

U.S. Pat. No. 5,167,976 teaches a method of extending the shelf-life of liquid egg product by employing a two-step heating process followed by cooling and packaging.

U.S. Pat. Nos. 3,843,813 and 5,290,583 show radio frequency and electroheating techniques applied to pasteurization of liquid egg products.

U.S. Pat. No. 4,994,291 reveals a method of ultrapasteurizing liquid whole egg product employing time and temperature parameters. In this reference, liquid whole egg product is subjected to heat treatment described by an equivalent temperature method followed by aseptically packaging the liquid whole egg product. Applicant incorporates by reference U.S. Pat. No. 4,994,291 in its entirety in the present application.

Although the method for ultrapasteurization of liquid whole egg product represents a great advance in the processing of raw egg product, restrictions posed by aseptically packaging pasteurized liquid egg product still exists.

A method for processing liquid egg products which overcomes the disadvantages found in the prior art methods and apparatuses would be a notable advance in the food processing field.

SUMMARY OF THE INVENTION

In accordance with the present invention a novel and useful process for producing pasteurized liquid egg products is herein provided.

The process of the present invention anticipates the providing of liquid raw egg product in a tank or vat which are obtained in the conventional manner, i.e., by obtaining whole eggs, breaking the shells of the whole eggs to obtain the liquid product therewithin, and discarding the shells. The liquid raw egg product is then packaged by transferring the same to air-tight containers. Prior to the transfer of the raw egg product, preheating may be applied to elevate the temperature of the raw product to approximately 60 degrees centigrade, e.g., a typical pasteurization temperature.

Where the liquid raw egg product is not pre-heated, sufficient heat is applied to the air-tight containers having the liquid raw egg product contained therein in order to elevate the temperature of the liquid raw egg pr lct to the pasteurization temperature. Heating may take place through different methods such as microwave, radio frequency (RF), or ohmic heating, through heat exchangers, or any other suitable heating technique. In any case, the packaged liquid egg product is then held at a pre-determined bold temperature, which may be according to the method described in U.S. Pat. No. 4,994,291 or other pasteurization techniques employing temperature and time standards.

Following pasteurization, the containerized product is rapidly cooled at a rate sufficient to refrigerate the egg product in the container in order to inhibit germination of bacterial spores therein. Agitation may be applied to the containers during the cooling of the prior heating steps in order to release or distribute heat evenly throughout the package and product. Such vibrational movement may be applied mechanically or through sonic methods. Moreover, the packaged egg product may then be shipped or stored while refrigerated. It has been found that the process of the present invention produces a liquid egg product with an extended shelf life without the restraints of aseptic packaging.

It may be apparent that a novel and useful process for producing pasteurized liquid egg product has been described.

It is therefore an object of the present invention to provide a process for producing pasteurized liquid egg product which may be employed to extend the shelf life of liquid egg product using a variety of heating methods normally employed in pasteurization.

Another object of the present invention is to provide a process for producing pasteurized liquid egg produce which overcomes the complexities of the prior art employed to pasteurized liquid raw egg product prior to packaging.

A further object of the present invention is to provide a process for producing pasteurized liquid egg produce which makes possible the use of packages having a variety of sizes, shapes, and materials not possible with the prior art methods of pasteurization of liquid egg products.

Another object of the present invention is to provide a process for producing pasteurized liquid egg products which obviates the possibility of post pasteurization contamination found in the prior art methods.

Yet another object of the present invention is to provide a process for producing pasteurized liquid egg produce which eliminates expensive equipment needed to pasteurize liquid egg products in the prior art methods.

Another object of the present invention is to provide a process for producing pasteurized liquid egg product which is less expensive than methods practiced in the prior art.

The invention possesses other objects and advantages especially as concerns particular characteristics and features thereof which will be apparent as the specification continues.

For a better understanding of the invention reference is made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments thereof which should be taken in conjunction with hereinabove described drawings.

Figure 1:
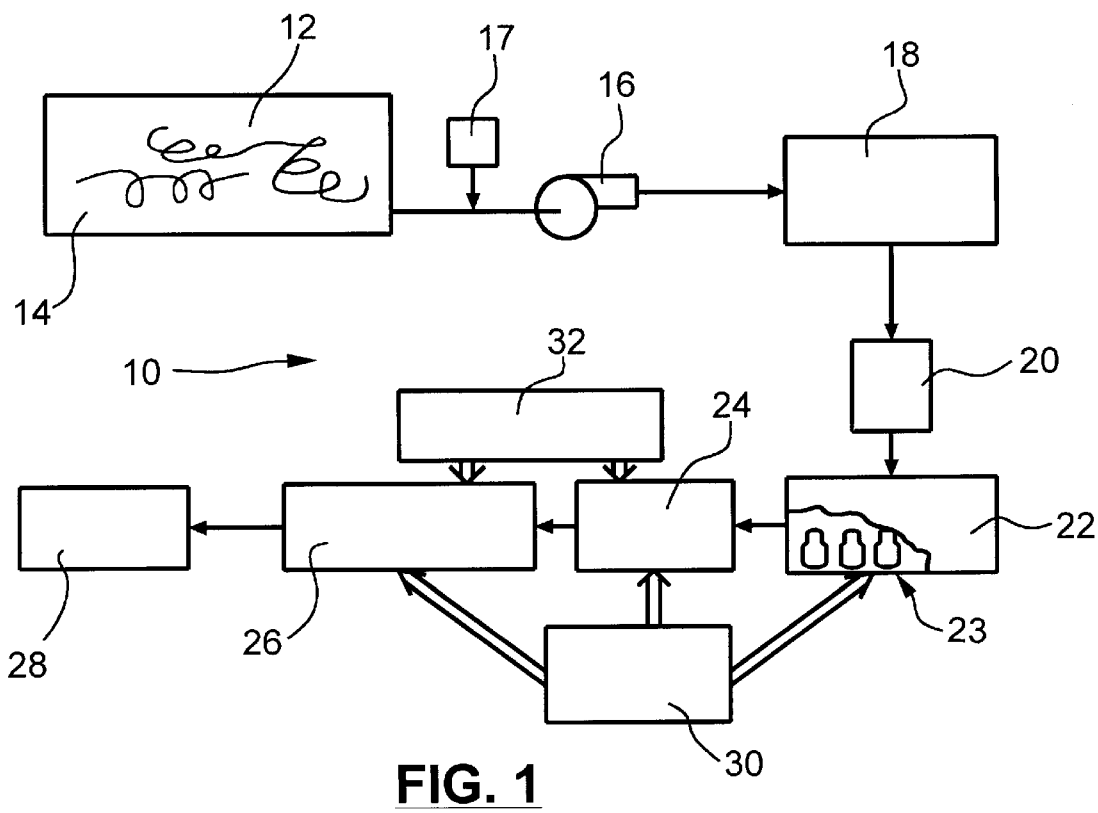
FIG. 1 is a block diagram showing a method of the present invention.

With reference to FIG. 1, the process 10 is shown schematically. Process 10 involves the provision of raw liquid egg product 12 which may be placed in a vat or tank 14. Raw liquid egg product 12 may take the form of raw eggs, egg mixes, egg substitute, or liquid egg products which may be a combination of the above. Vat 14 serves as a source for pump 16 which transfers raw liquid egg product 12 to preheater 18. Chemical injector 17 may be employed to add bacteria destroying entities, such as hydrogen peroxide, in accordance with prior art methods. Raw liquid egg product 12 passing into preheater 18 is subjected to heat which is sufficient to pasteurize the product 12. In certain cases a chemical entity such as hydroge peroxide, may be added to raw liquid egg product 12. Such addition tends to reduce the necessary temperature of pasteurization and tends to obviate coagulation of product 12. In other words, the raw egg product 12, without the addition of a chemical entity, may be raised to approximately 60 degrees centigrade by direct or indirect heating, radio waves, microwaves, ohmic induction, and/or other suitable methods. Heating may be accomplished without coagulating the liquid egg product 12. Homogenizer and pump 20 transfers the heated liquid egg product from preheater 18 to a packager 22 where specific amounts of heated liquid egg product are placed in plurality of air-tight containers 23. Such air-tight containers 23 may take the form of plastic bottles, metal cans, plastic bags, glass jars, or any other type of packaged which have air-tight integrity. It should also be noted that such packages are not possible with the cost and/or technical restrictions of aseptic packaging systems used in the prior art. Containers 23 exiting packager 22 then pass to holding chamber 24 which maintains the pasteurization temperature by the circulation of air or liquid for a predetermined period of time. Following holding, containers 23 from chamber 24 pass to cooler 26 where such containers having the liquid egg product are rapidly cooled to refrigeration levels. Containers 23 exiting cooler 24 are then sent to packager 28 which essentially combines containers 23 from packager 22 into larger containers for shipment and use. Pressure means 30 is depicted in FIG. 1 as applying an optional pressure to packager 22, holding chamber 24, and cooler 26. Pressure means 30 may take the form of a pressure chamber which would encompass packager 22, holding chamber 24, and cooler 26.

Agitator 32 is also depicted in FIG. 1 and may be applied to the containers 23 found in holding chamber 24 and cooler 26 in order to enhance heat exchange therein. That is to say, agitation would aid in the maintaining of heat in holding chamber 24 while the same agitation applied by agitator 32 would aid in the removal of heat from containers found within cooler 26.

Figure 2:
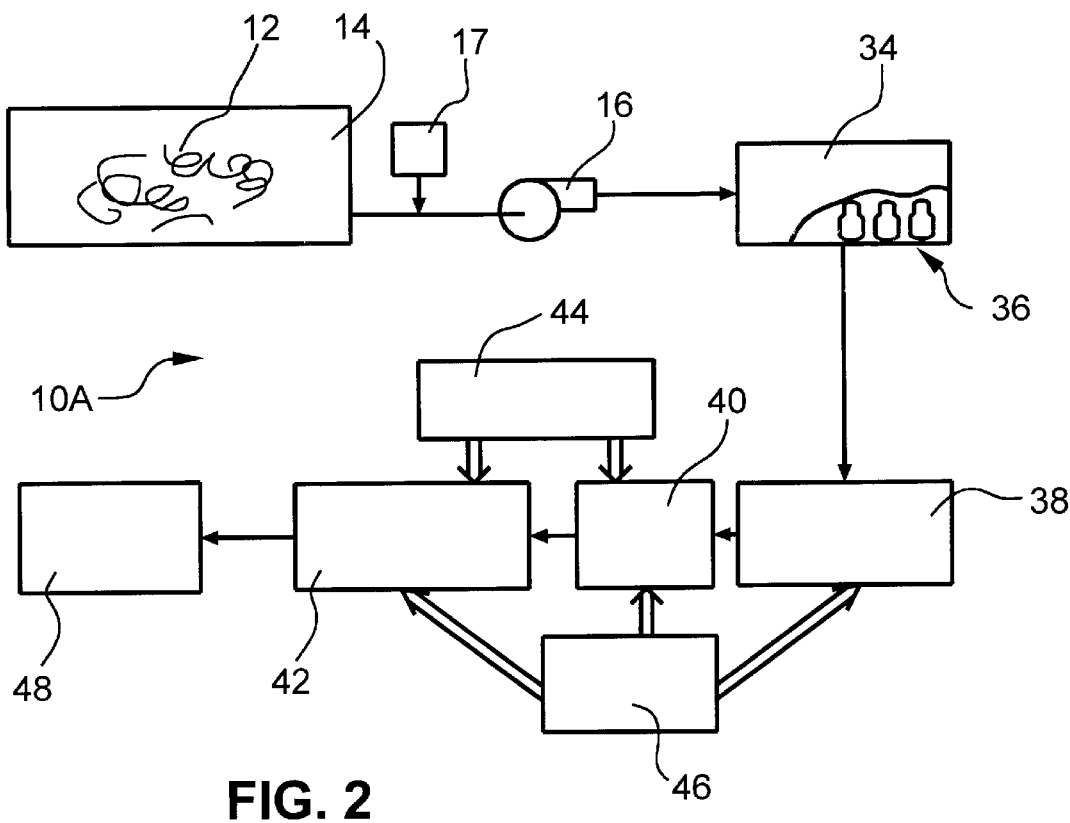
FIG. 2 is a block diagram showing an alternative method of the present invention.

Turning to FIG. 2, it may be observed that an alternate process 10A is described. Raw egg liquid product 12, of the same type used in process 10 of FIG. 1, is provided in vat 14. Pump 16 transfers the raw liquid egg product 12 to packager 34 which fills a plurality of containers 36, similar to plurality of containers 23 exiting packager 22 of FIG. 1. Again, chemical injector 17 may be employed in the same manner as described in FIG. 1. Containers 36 are then passed to heater 38 which again may take the form of direct or indirect heating, radio waves, microwaves, emersion in hot fluid or air, and the like. Containers 36 in heater 38 travel to holding chamber 40 which maintains the proper pasteurization temperature of container 36 for a pre-determined period of time to kill microorganisms without coagulating the liquid egg product within plurality of containers 36. Containers 36 then pass to cooler 42 which rapidly removes heat from containers 36 to a refrigeration level. Again, agitator 44 may apply vibrational energy to holding chamber 40 and cooler 42 for the purposes of heat exchange. In addition, pressure means 46 may impose a pressure on heater 38, holding chamber 40, and cooler 42 by the application of an encompassing pressure chamber about these elements. Packager 48 combines plurality of containers 36 into a large package for shipment under refrigeration and eventually used by a consumer.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

The following examples are further provided to illustrate the invention but are not deemed to limit the same in any manner.

EXAMPLE 1

Two boxes containing 15 dozen poultry eggs were purchased commercially. The boxes of eggs were kept in an unheated room at outside ambient temperature on Sep. 6, 1994 in Richmond, Calif. On the following day, 15 dozen of the eggs were broken from their shells and blended. The blended eggs were then transferred to a plastic jug and placed under refrigeration. The eggs at the time of blending possessed a B grade quality, i.e., the whites possessed visual firmness and air pocket size. Two days later 10 millimeters of raw commercial egg liquid, which war previously frozen on May 17, 1994, was added to the liquid egg product in the plastic jug to insure contamination. Three liters of the liquid egg product were heated in a one gallon plastic jug which was placed in a hot water bath. After the liquid egg temperature reach 65 degrees centigrade, three (3) one liter plastic bottles were filled, sealed, and placed in hot water at 65 to 67 degrees centigrade for 20 minutes. Following the 20 minute hold in the hot water bath, the three (3) one-liter plastic bottles containing the liquid egg product were placed in a salt water and ice solution possessing a temperature of (−2) degrees centigrade and agitated. The cooling and agitation extended for 17 minutes at which time the bottles were removed, rinsed in tap water, and placed in a refrigerator.

EXAMPLE 2

Egg samples were prepared in one-liter plastics bottles in the same manner as the samples found in Example I, except that shell and egg were kept in the same container without blending. Instead of bathing the samples in hot water, the samples of this example were heated in a microwave at 57–60 degrees celsius, placed in a hot water bath at 57 to 60 degrees celsius for 30 minutes, and then refrigerated.

EXAMPLE 3

A third sample was prepared on Sep. 15, 1994 by filling two (2) two-liter bottles with the raw liquid egg material prepared in Example I. The raw liquid egg material of Example I was kept in a refrigerator between Sep. 9, 1994 and Sep. 15, 1994, thus the packaging of this third sample occurred approximately six (6) days after the packaging of Example I. The bottles of this example were heated to a temperature of about 57 to 60 degrees celsius in a microwave, placed in a hot water bath between 57 and 60 degrees celsius fc 30 minutes, and then refrigerated.

EXAMPLE 4

Liquid egg product prepared in Example I was kept in a refrigerator for one week and retrieved on Sep. 15, 1994. The liquid egg sample was placed into a two-liter bottle and mixed with 25 percent lowfat (2% fat pasteurized milk). The bottle was heated in a microwave and held between 57 and 60 degrees centigrade for 30 minutes and then cooled.

EXAMPLE 5

Hand broken eggs were placed into a plastic one-liter bottle directly without excessive agitation on Sep. 9, 1994. The bottle was heated in a microwave to attain a temperature of 57 to 60 degrees centigrade and held at 57 to 60 degrees celsius for 30 minutes. It was observed that some cooking of the egg product in the cap area of the bottle occurred due to low agitation.

The five (5) samples of Examples 1–5 were evaluated organoleptically after approximately 60 days from the preparation of the samples found in Examples 3 and 4. The plastic bottles were uncapped from each of the samples and small amounts of the contents were poured into glasses for evaluation. The bottles were then recapped and placed in a domestic freezer for further bacterial testing. Each of the samples of Examples 1, 3 and 4 were also tested upon preparation and then 10–11 weeks later for microbial content. Table 1 represents the results. Samples of Examples 1–3 showed excellent results. Sample 4 included a rather high bacteria count which is believed due to the condition of milk in the product. Sample 5 is believed to have been contaminated by excessive heating in the cap area of the plastic bottle which may have activated spore forming bacteria or a micro-leak in the topseal. The latter possibility may have allowed bacteria to enter the container during cooling, contaminating the product.

EXAMPLE 6

A sample of Example 2 was retrieved 14 weeks from preparation. The product appeared to be in excellent condition having good color, smell, and cooked taste. Cake height tests were performed according to methods found in an article by Ball et al., 1987 (functionality and Microbial stability of . . . ) Journal of Food Science, 52 (5) p. 1212:1218.

TABLE 1

| EXAMPLE NO: | | Time Weeks | | |
|---|---|---|---|---|
| | | 0 | 10 | 11 |
| I | TPC | 4000 | — | <10 |
| | COLI | 9 | — | 0 |
| | ORGAN | CK | — | OK |
| II | TPC | — | — | <10 |
| | COLI | — | — | 0 |
| | ORGAN | — | — | OK |
| III | TPC | $6.2 \times 10^6$ | <10 | — |
| | COLI | 240 | <3 | — |
| | ORGAN | OK | OK | — |
| IV | TPC | $4.10 \times 10^6$ | $2.510^6$ | — |
| | COLI | 240 | <3 | — |
| | ORGAN | OK | OK | — |
| V | TPC | — | — | $5.7 \times 10^6$ |
| | COLI | — | — | <3 |
| | ORGAN | — | — | OK |

Where T.P.C. is Total Plate Count: Coli is *E. Coli* form Count; and "Organ" is organoleptic evaluation.

The following results were found according to Table II below.

TABLE 2

| | Reading (CM) | | | |
|---|---|---|---|---|
| Cake No: | 1 | 2 | 3 | Average: |
| 1. Liquid Egg | 6.4 | 6.0 | 6.3 | 6.02 |
| 2. Liquid Egg | 5.9 | 5.8 | 5.7 | |
| 3. Shell Egg | 6.1 | 5.8 | 6.0 | 6.12 |
| 4. Shell Egg | 6.0 | 6.5 | 6.3 | |

Although the present invention has been discussed in the prior examples in great detail, such discussion has been for the purpose of illustration only. The scope of the invention is now defined by the following claims.

What is claimed is:

1. A process for extending the shelf life of a raw liquid egg product, comprising:

preparing a given volume of the raw liquid egg product for subsequent consumption;

heating the raw liquid egg product to at least 57° C. and to a temperature level which is sufficient to begin pasteurization of the raw liquid egg product;

pumping the given volume of the heated raw liquid egg product into a container while the liquid egg product is maintained at said temperature level;

sealing the container in a substantially air-tight manner to facilitate storage of the liquid egg product;

transferring the sealed container to a heater to facilitate further in-package pasteurization of the heated liquid egg product;

continuing to maintain the temperature of the heated liquid egg product in the container at said temperature level for a first predetermined period of time of no longer than 60 minutes to complete the pasteurization of the liquid egg product; and cooling the pasteurized liquid egg product for a second predetermined period of time to a refrigeration temperature of between 5° C. and −2° C.

2. A process according to claim 1, wherein the step of heating the liquid egg product includes raising the temperature of the liquid egg product to between 65° C. and 67° C.

3. A process according to claim 1 wherein the temperature level is between 65° C. and 67° C.

4. process according to claim 1, wherein the first predetermined period of time is between 20 minutes and 60 minutes.

5. A process according to claim 4, wherein the first predetermined period of time is preferably between 20 minutes and 30 minutes.

6. A process according to claim 5, wherein the first predetermined period of time is more preferably 30 minutes.

7. A process according to claim 1, further comprising:

agitating the liquid egg product during the step of heating the liquid egg product.

8. A process according to claim 1, further comprising:

agitating the container during the step of maintaining the temperature of the heated liquid egg product in the container at the temperature level.

9. A process according to claim 1, further comprising:

applying pressure to the container during the step of maintaining the temperature of the container.

10. A process according to claim 1, further comprising:

adding a chemical sterilizer following the step of preparing the given volume of the raw liquid egg product.

11. A process for extending the refaigerated shelf life of a liquid egg product, comprising:

heating the egg product to at least 57° C. and to a temperature level which is sufficient to begin pasteurization of raw liquid egg product but not sufficient to cause the liquid egg product to substantially coagulate;

packaging a predetermined volume of the heated liquid egg product into at least one container while the liquid egg product is maintained at said temperature level for facilitating storage of the liquid egg product for subsequent consumption;

transporting the liquid egg product within the container to a thermal holding chamber;

continuing to maintain the temperature of the container with the heated liquid egg product in it at said temperature level for a first predetermined period of time to complete the pasteurization thereof while not causing the liquid egg product to substantially coagulate;

transporting the liquid egg product within the container to a cooler to facilitate cooling the liquid egg product;

cooling rapidly the liquid egg product within the container to a refrigeration temperature within a second predetermined period of time; and transporting the cooled liquid egg product within the container to a refrigerator for maintaining the temperature of the liquid egg product substantially at the refrigeration temperature for an extended shelf life period.

12. A process according to claim 11, wherein the extended shelf life is from a period greater than 10 weeks.

13. A process according to claim 11, wherein the first predetermined period of time is between 20 minutes and 60 minutes.

14. A process according to claim 13, wherein the first predetermined period of time is preferably 30 minutes.

15. A process according to claim 11, wherein the second predetermined period of time is preferably 17 minutes.

16. A process according to claim 11, further comprising:

agitating the container during at least a portion of the second predetermined period of time for helping to cool uniformly the liquid egg product.

17. A process according to claim 11, fuirther comprising:

adding a given volume of a bacteria-destroying entity to the liquid egg product prior to heating the liquid egg product.

18. A process according to claim 1, wherein the second predetermined period of time is no greater than 17 minutes.

* * * * *

UNITED STATES PATENT AND TRADEMARK OFFICE
CERTIFICATE OF CORRECTION

PATENT NO : 6,024,999
DATED : Feb. 15, 2000
INVENTOR(S) : Hamid-Samimi

It is certified that error appears in the above-identified patent and that said Letters Patent is hereby corrected as shown below:

In the abstract, line 3, "amibient" should be "ambient".
Column 1, line 30, "ftom" should be "From".
Column 1, line 38, "roducts" should be "products".
Column 1, line 54, "pa" should be "pH".
Column 2, line 39, "pr lct" should be "product".
Column 2, line 44, "bold" should be "hold".
Column 3, line 58, "hydroge" should be "hydrogen".
Column 5, line 8, "war" should be "was".
Column 5, line 43, "fc" should be "for".
Column 6, line 18, "Microbial" should be "microbial".
Column 6, line 28, in Table 1, "CK" should be "OK".
Column 6, line 40, the colon ":" should be a semi-colon ";".
Column 7, line 44, "refaigerated" should be "refrigerated".
Column 8, line 41, "fuirther" should be "further".

Signed and Sealed this

Fifth Day of December, 2000

Attest:

Q. TODD DICKINSON

*Attesting Officer*     *Director of Patents and Trademarks*